(12) United States Patent
Johansson et al.

(10) Patent No.: US 9,853,846 B2
(45) Date of Patent: Dec. 26, 2017

(54) CONFIGURATION DEPENDENT COMPENSATION ROTATION OF SYMBOLS

(71) Applicant: Telefonaktiebolaget LM Ericsson (publ), Stockholm (SE)

(72) Inventors: Niklas Johansson, Uppsala (SE); Ansuman Adhikary, Santa Clara, CA (US); Asbjörn Grövlen, Stockholm (SE); Xingqin Lin, San Jose, CA (US); Yutao Sui, Solna (SE); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/403,753

(22) Filed: Jan. 11, 2017

(65) Prior Publication Data

US 2017/0201403 A1    Jul. 13, 2017

Related U.S. Application Data

(60) Provisional application No. 62/277,295, filed on Jan. 11, 2016.

(51) Int. Cl.
*H04L 27/20* (2006.01)
*H04L 27/26* (2006.01)
(Continued)

(52) U.S. Cl.
CPC ....... *H04L 27/2007* (2013.01); *H04B 7/0639* (2013.01); *H04L 27/2607* (2013.01);
(Continued)

(58) Field of Classification Search
CPC . H04B 7/01; H04B 7/02; H04B 7/028; H04B 7/04; H04B 7/0404; H04B 7/06;
(Continued)

(56) References Cited

U.S. PATENT DOCUMENTS 6,285,654 B1 *   9/2001   Marchok ................ H04L 5/023
                                                        370/208
2004/0264599 A1 * 12/2004   Lliev ................... H04L 27/2053
                                                        375/298
(Continued)

FOREIGN PATENT DOCUMENTS

EP    2169890 A1    3/2010
EP    2418814 A1    2/2012
(Continued)

OTHER PUBLICATIONS

International Search Report and Written Opinion dated May 30, 2017 for International Application Serial No. PCT/SE2017/050021, International Filing Date: Jan. 11, 2017 consisting of 15-pages.
(Continued)

*Primary Examiner* — Young T Tse
(74) *Attorney, Agent, or Firm* — Christopher & Weisberg, P.A.

(57) ABSTRACT

A user equipment (UE) is provided. The UE includes processing circuitry configured to rotate a symbol of a plurality of symbols for transmission. An amount of rotation of the symbol of the plurality of symbols is based on at least one of a cyclic prefix length of the symbol of the plurality of symbols and position of a subcarrier on which the symbol of the plurality of symbols is to be transmitted. The UE includes a transmitter configured to cause transmission of the plurality of symbols.

28 Claims, 13 Drawing Sheets

(51) Int. Cl.
*H04B 7/06* (2006.01)
*H04L 27/34* (2006.01)
*H04W 88/02* (2009.01)

(52) U.S. Cl.
CPC ...... *H04L 27/2614* (2013.01); *H04L 27/3444* (2013.01); *H04W 88/02* (2013.01)

(58) Field of Classification Search
CPC .. H04B 7/0613; H04B 7/0639; H04B 7/0682; H04B 7/0689; H04L 27/18; H04L 27/186; H04L 27/20; H04L 27/2007; H04L 27/2014; H04L 27/2021; H04L 27/2025; H04L 27/2028; H04L 27/2035; H04L 27/2046; H04L 27/205; H04L 27/2053; H04L 27/2057; H04L 27/206; H04L 27/2085; H04L 27/2626; H04L 27/2627; H04L 27/34; H04L 27/3411; H04L 27/361; H04L 27/362; H04L 27/2607; H04L 27/2614; H04L 27/3444; H04W 88/00; H04W 88/02
USPC ........ 375/260, 261, 267, 279–281, 295–299, 375/308; 370/208, 210
See application file for complete search history.

(56) References Cited

U.S. PATENT DOCUMENTS

| | | | | |
|---|---|---|---|---|
| 2007/0189414 A1* | 8/2007 | Kawasaki | ........... | H04L 27/2621 375/295 |
| 2009/0220019 A1* | 9/2009 | Kwon | ................. | H04L 27/2621 375/261 |
| 2011/0103405 A1* | 5/2011 | Lipka | .................. | H04L 27/2636 370/480 |
| 2016/0087766 A1* | 3/2016 | Sun | ....................... | H04L 5/0007 370/329 |
| 2016/0277224 A1* | 9/2016 | Liu | .......................... | H04L 27/20 |
| 2016/0277936 A1* | 9/2016 | Hasegawa | ................ | H04J 11/00 |

FOREIGN PATENT DOCUMENTS

WO 2007123340 A2 11/2007
WO 2009156846 A1 12/2009

OTHER PUBLICATIONS

3GPP TSG-RAN1 #83 Anaheim, US-R1-157666 Source: Ericsson, Title: NB-IoT—SC-FDMA UL spectrum characteristics, PAPR, and relative cubic metric, Document for: Discussion and decision, Agenda Item: 6.2.6.1.1 Nov. 15-22, 2015 consisting of 18-pages.

3GPP TSG RAN WG1 Meeting #83, R1-157470, Title: "On the Impact of a Realistic PA Model on SC-FDMA Uplink", Agenda Item: 6.2.6.2.3, Source: Neul, Huawei, HiSilicon, Conference Location and Date: Nov. 15-22, 2015, Anaheim, California, US consisting of 12-pages.

* cited by examiner

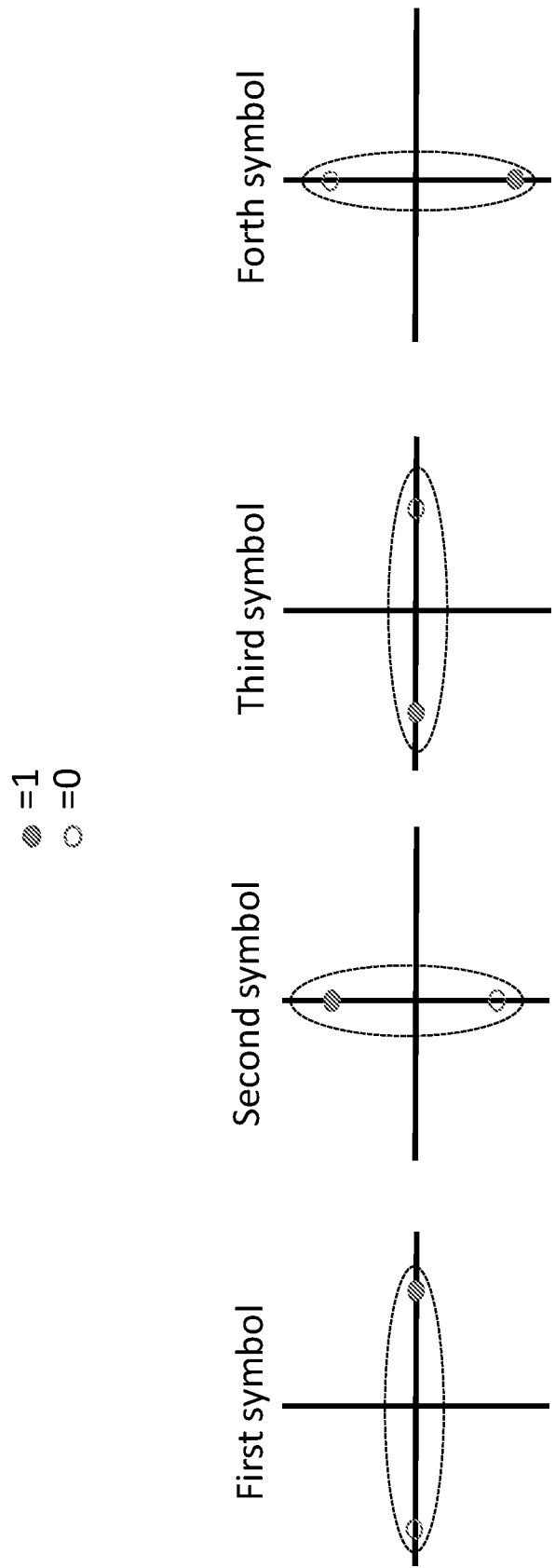

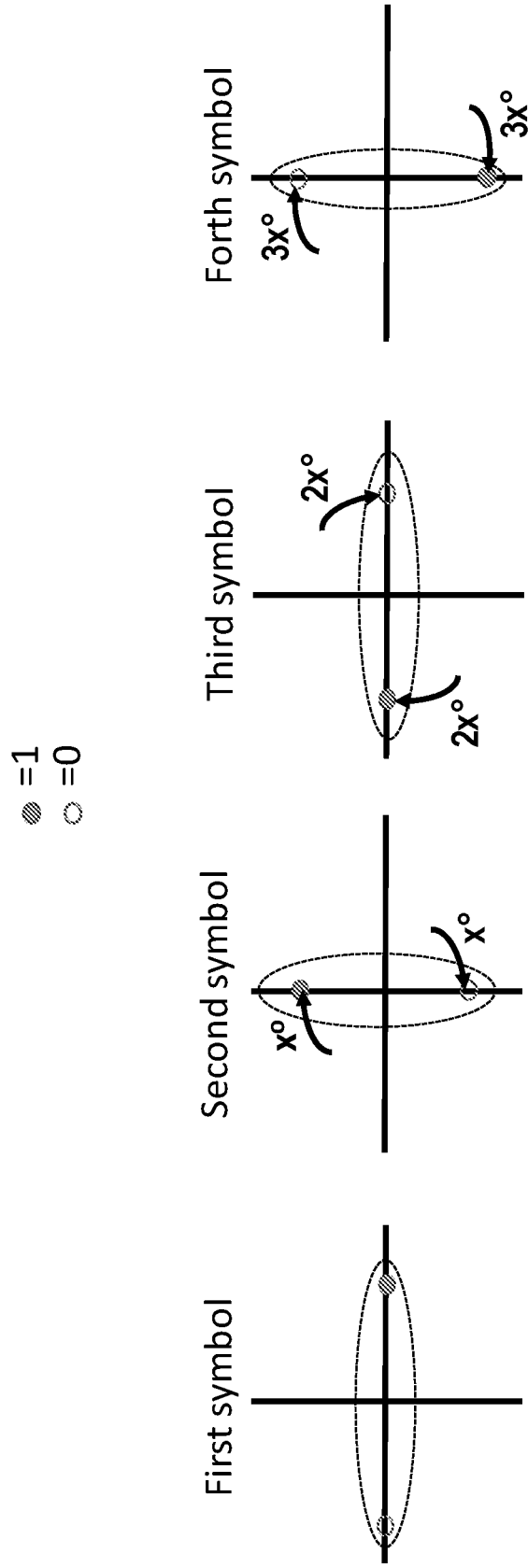

CONFIGURATION DEPENDENT COMPENSATION ROTATION OF SYMBOLS

CROSS-REFERENCE TO RELATED APPLICATIONS

This application claims priority to U.S. Provisional Application No. 62/277,295, filed Jan. 11, 2016, entitled "SUBCARRIER POSITION DEPENDENT MODULATION ROTATION," the entirety of which is incorporated herein by reference.

TECHNICAL FIELD

The present disclosure relates to a method, system and wireless device for wireless communications, and in particular to rotation of symbols for transmission.

BACKGROUND

To enable inexpensive power amplifiers (PA) in wireless communication devices or user equipment (UE), hereinafter collectively referred to as user equipment, the communication system may allow the option of using signals with small amplitude variations. In such cases, the linear region of the PA can be smaller or non-existent.

In Single-Carrier Frequency Division Multiple Access (SC-FDMA) systems such as Long-Term Evolution (LTE) or NarrowBand Internet of Things (NB-IoT), a single-subcarrier, or single-tone, transmission is used to achieve a signal with close to unit amplitude. SC-FDMA has two subcarrier spacing options: 15 kHz for single-tone and multi-tone transmissions, and 3.75 kHz for single-tone transmission only. The objective of NB-IoT is to address improved indoor coverage, support for massive number of low throughput devices, low delay sensitivity, ultra-low device cost, low device power consumption and optimized network architecture. In one or more embodiments, two modulation options are considered for NB-IoT uplink which are pi/2 BPSK and pi/4 QPSK. In these predefined modulations, the constellation is rotated pi/2 or pi/4 radians every symbol. In general, these rotations would allow smoother transitions between constellation points, reducing the peak to average power ratio (PAPR). These modulation options are considered for uplink data and control channel transmissions, except for M-PRACH preambles.

The NB-IoT uplink signal, in one or more embodiments, is composed of one to twelve 15 kHz subcarriers within the 180 kHz bandwidth. The signal spectrum characteristics 10 of a twelve subcarrier or twelve tone transmission is illustrated in FIG. 1. The transmitted signals have a maximum power level of 23 dBm power. In GSM, UEs have at least 33 dBm maximum output power, and the interference is controlled by ensuring that the transmission is contained within a spectral emission mask set according to the maximum transmit power of the UEs. Since NB-IoT UEs will typically transmit with 23 dBm output power, two special emission mask are used in the evaluations. The "33 dBm GSM mask 14" corresponds to the mask requirements that a GSM UE would fulfill, and the "23 dBm mask 16" where the 33 dBm mask has been adjusted down by 10 decibels. FIG. 1 illustrates a twelve tone NB-IoT uplink transmission under ideal conditions. As illustrated in FIG. 1, the twelve tone NB-IoT transmission fulfills the GSM spectrum masks 14 and 16.

FIG. 2 illustrates signal spectrum characteristics 10 of a single-subcarrier transmission of NB-IoT with 15 kHz subcarrier spacing, positioned in the leftmost, middle and rightmost, subcarrier under ideal conditions. In other words, FIG. 2 illustrates the power spectral density 12 of a single 15 kHz subcarrier NB-IoT uplink transmission 18 at subcarrier offsets 0, 5 and 11. As illustrated in FIG. 2, the figure shows that the 15 kHz NB-IoT uplink transmission 18 fulfills GSM masks 14 and 16 also with single-subcarrier transmission, where the figure represents both BPSK and QPSK modulation. FIG. 3 illustrates the signal spectrum characteristics 10 of multi-tone NB-IoT with 15 kHz spacing. In particular, NB-IoT with 15 kHz subcarrier spacing fulfills the GSM spectral emission masks 14 and 16 requirements under ideal conditions such as using an ideal power amplifier.

In wireless communication, single-carrier signals can have unit amplitude, but the amplitude may vary at the transition between modulation symbols. Such a situation is problematic. A way to minimize the amplitude variation between modulation symbols such as Binary Phase-Shift Key (BPSK) modulation symbols is to rotate each subsequent symbol constellation by 90 degrees, or pi/2 radians, creating a "pi/2 BPSK modulation". For Quadrature Phase Shift Keying (QPSK) the corresponding rotation is 45 degrees or pi/4 radians, creating pi/4 QPSK. By minimizing amplitude variations between modulation symbols the average power ratio is reduced in the transmission waveform.

FIG. 4 is a diagram of the signal spectrum characteristics 10 of a pi/2 BPSK single-subcarrier NB-IoT transmission at different subcarrier positions. In particular, FIGS. 4 and 5 described herein use a PA model with impairments that mimic a realistic PA model as an ideal (unrealistic) PA model would likely not have issues with meeting a GSM spectral emission mask (GSM mask) requirements, discussed below, but would likely fail in the field or real life. As illustrated in FIG. 4, the power spectral density 12 of pi/2 BPSK fulfills the 33 dBm GSM spectrum mask 14 requirements at all subcarrier positions but is not able to fulfill the 23 dBm mask 16 requirements at all subcarrier positions.

FIG. 5 is a diagram of signal spectrum characteristics 10 of a pi/2 BPSK single-subcarrier NB-IoT transmission 18 at different subcarrier positions with a 2.3 dB back-off applied. As illustrated in FIG. 5, the power spectral density 12 of pi/2 BPSK transmission 18 fulfills the 33 dBm GSM spectrum mask 14 requirements at all subcarrier positions and also fulfills the 23 dBm mask 16 requirements at all subcarrier positions, but requires back-off such that the maximum output power level of the PA is disadvantageously reduced. PA backoff also results in a reduction in PA efficiency and lower energy efficiency, which reduces the battery life.

SUMMARY

The present disclosure advantageously provides a method, device, and system for modulation rotation of a plurality of symbols for transmission in which the amplitude variations between transitions of the symbols is reduced and/or minimized.

According to one or more embodiments of the disclosure, a user equipment, UE, is provided. The UE includes processing circuitry configured to rotate a symbol of a plurality of symbols for transmission. An amount of rotation of the symbol of the plurality of symbols is based on at least one of a cyclic prefix length of the symbol and position of a subcarrier on which the symbol is to be transmitted. The UE includes a transmitter configured to cause transmission of the plurality of symbols.

According to one or more embodiments of this aspect, the symbol of the plurality of symbols has a predefined modulation rotation in addition to the amount of rotation of the symbol of the plurality of symbols. According to one or more embodiments of this aspect, the predefined modulation rotation is one of Binary Phase-Shift Key, BPSK, modulation and Quadrature Phase Shift Keying, QPSK, modulation. According to one or more embodiments of this aspect, the amount of rotation of the symbol of the plurality of symbols is configured to counteract an induced rotation caused by at least one transmission configuration of the symbol of the plurality of symbols during transmission. The induced rotation is different from the predefined modulation rotation.

According to one or more embodiments of this aspect, the at least one configuration for transmission of the symbol of the plurality of symbols includes at least one of cyclic prefix length of the symbol of the plurality of symbols, position of a subcarrier on which the symbol of the symbol of the plurality of symbols is to be transmitted, amplitude distortion of the transmitter and phase distortion of the transmitter. According to one or more embodiments of this aspect, the amount of rotation of the symbol of the plurality of symbols is substantially equal to the induced rotation. According to one or more embodiments of this aspect, the amount of rotation of the symbol of the plurality of symbols is configured to compensate for the induced rotation such that the symbol of the plurality of symbols adheres to the predefined modulation rotation.

According to one or more embodiments of this aspect, the predefined modulation rotation is one of 45 and 90 degrees. According to one or more embodiments of this aspect, the amount of rotation of the symbol of the plurality of symbols is with respect to a modulation constellation diagram. According to one or more embodiments of this aspect, the plurality of symbols are transmitted at different instances of time. According to one or more embodiments of this aspect, the position of the subcarrier is not centered at a direct current (DC) frequency. According to one or more embodiments of this aspect, the processing circuitry is further configured to rotate another of the plurality of symbols by the amount of rotation of the symbol of the plurality of symbols. The amount of rotation is configured to compensate for the induced rotation such that the other symbol of the plurality of symbols adheres to the predefined modulation rotation. According to one or more embodiments of this aspect, the transmitter is a transmitter chain. The amount of rotation of the symbol is further based on one of a predetermined amplitude distortion and a predetermined phase distortion, introduced by the transmitter chain. According to one or more embodiments of this aspect, the processing circuitry is configured to rotate the symbol of the plurality of symbols by being configured to apply a phase rotation to the symbol of the plurality of symbols.

According to another aspect of the disclosure, a method is provided. A symbol of a plurality of symbols for transmission is rotated. An amount of rotation of the symbol of the plurality of symbols is based on at least one of a cyclic prefix length of the symbol and position of a subcarrier on which the symbol is to be transmitted. Transmission of the plurality of symbols is caused.

According to one or more embodiments of this aspect, the symbol of the plurality of symbols has a predefined modulation rotation in addition to the amount of rotation of the symbol of the plurality of symbols. According to one or more embodiments of this aspect, the predefined modulation rotation is one of Binary Phase-Shift Key, BPSK, modulation and Quadrature Phase Shift Keying, QPSK, modulation. According to one or more embodiments of this aspect, the amount of rotation of the symbol of the plurality of symbols is configured to counteract an induced rotation caused by at least one transmission configuration of the symbol of the plurality of symbols during transmission. The induced rotation is different from the predefined modulation rotation.

According to one or more embodiments of this aspect, the at least one configuration for transmission of the symbol of the plurality of symbols includes at least one of cyclic prefix length of the symbol of the plurality of symbols, position of a subcarrier on which the symbol of the symbol of the plurality of symbols is to be transmitted, amplitude distortion of the transmitter and phase distortion of the transmitter.

According to one or more embodiments of this aspect, the amount of rotation of the symbol of the plurality of symbols is substantially equal to the induced rotation. According to one or more embodiments of this aspect, the amount of rotation of the symbol of the plurality of symbols is configured to compensate for the induced rotation such that the symbol of the plurality of symbols adheres to the predefined modulation rotation.

According to one or more embodiments of this aspect, the predefined modulation rotation is one of 45 and 90 degrees. According to one or more embodiments of this aspect, the amount of rotation of the symbol of the plurality of symbols is with respect to a modulation constellation diagram. According to one or more embodiments of this aspect, the plurality of symbols are transmitted at different instances of time. According to one or more embodiments of this aspect, the position of the subcarrier is not centered at a direct current (DC) frequency.

According to one or more embodiments of this aspect. Another of the plurality of symbols is rotated by the amount of rotation of the symbol of the plurality of symbols. The amount of rotation is configured to compensate for the induced rotation such that the other symbol of the plurality of symbols adheres to the predefined modulation rotation. According to one or more embodiments of this aspect, the plurality of symbols are transmitted by a transmitter chain. The amount of rotation of the symbol is further based on one of a predetermined amplitude distortion and a predetermined phase distortion, introduced by the transmitter chain. According to one or more embodiments of this aspect, rotating the symbol of the plurality of symbols includes applying a phase rotation to the symbol of the plurality of symbols.

According to another aspect of the disclosure, a user equipment, UE, is provided. The UE includes a rotation compensation processing module. The rotation compensation processing module is configured to rotate a symbol of a plurality of symbols for transmission. An amount of rotation of the symbol of the plurality of symbols is based on at least one of a cyclic prefix length of the symbol and position of a subcarrier on which the symbol is to be transmitted. The rotation compensation processing module is further configured to cause transmission of the plurality of symbols.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIGS. 9A-9D are constellation diagrams of respective symbols according to a predefined modulation rotation of pi/2 BPSK without induced rotation in accordance with the principles of the disclosure;

FIGS. 11A-11D are constellation diagrams of respective symbols according to a predefined modulation rotation of pi/2 BPSK where the induced rotation caused by one or more configurations for transmission has been compensated for by rotating the symbols, in accordance with the principles of the disclosure;

DETAILED DESCRIPTION

It has been determined that if no subcarrier is centered at the DC frequency, as in NB-IoT, the modulation constellation in baseband rotates in the complex plane, and the speed and direction of the rotation is determined by the subcarrier offset, i.e., unwanted rotation is induced. The inventors also discovered that if each OFDM symbol is further extended by the cyclic prefix, the final symbol is somewhat longer than an integer number of rotations. Because of this "induced" rotation or rotation that is caused by the transmission scheme during transmission, the rotation of symbols and transitions between symbols such as $\pi/2$ BPSK symbols does not adhere to the predefined modulation rotation of $\pi/2$ BPSK, for example, but varies dependent on the one or more configurations used for transmission. Therefore, the transition between symbols will be more abrupt than expected, resulting in greater amplitude variations.

The disclosure describes the spectral characteristics, the relative cubic metric compared to GMSK, and the performance with a realistic PA model, of NB-IoT uplink with SC-FDMA and a subcarrier spacing of 15 kHz.

Figure 4:
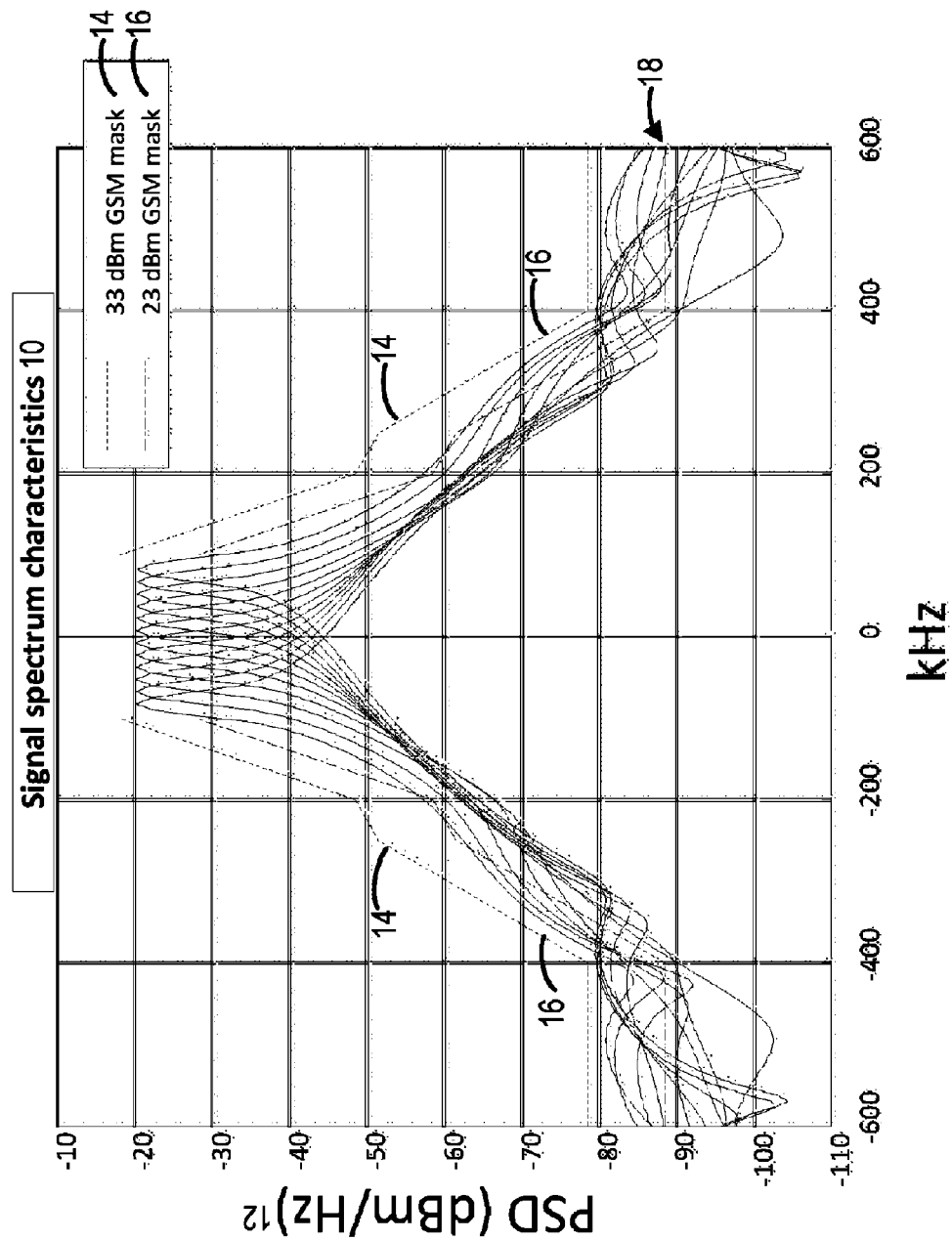
FIG. 4 is a diagram of signal spectrum characteristics of a pi/2 BPSK single-subcarrier NB-IoT transmission at different subcarrier positions.
Figure 5:
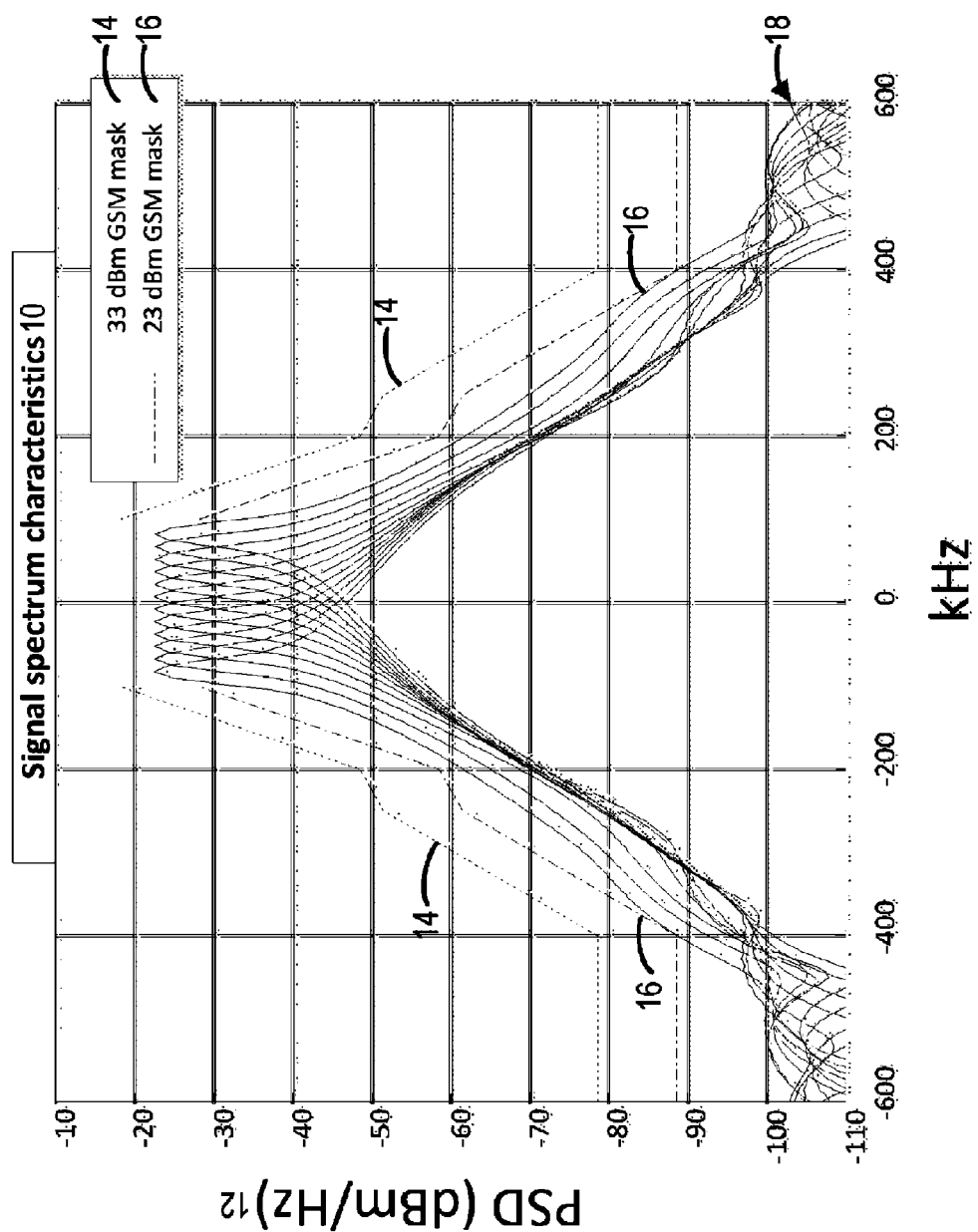
FIG. 5 is a diagram of signal spectrum characteristics of a pi/2 BPSK single-subcarrier NB-IoT transmission, at different subcarrier positions, with 2.3 dB back-off.

Referring back to FIG. 4, the reason for not being able to fulfill the 23 dBm mask 16 requirements is because the inventors discovered that transitions between $\pi/2$ BPSK symbols are not $\pi/2$ radians or 90 degrees, but vary depending on the subcarrier position and the cyclic prefix length such that the transition between symbols is more abrupt than expected, resulting in greater amplitude variations. In other words, the induced rotation caused by the one or more configurations used for transmission results in greater amplitude variations even though $\pi/2$ BPSK, in this example, is used to help reduce these variations.

The instant disclosure provides a method, user equipment and system for counteracting or compensating for the induced rotation that the inventors discovered was negatively impacting the symbols and mask 16 requirements. In particular, the method(s) and user equipment(s) described herein advantageously provide rotation, e.g., compensation rotation, of a plurality of symbols or constellation points for transmission. In one or more embodiments, the rotation of the plurality of symbols is compensation rotation that reduces and/or minimizes the amplitude variations between transitions of the symbols. In one or more embodiments, the amount of rotation of each symbol is configured to counteract an induced rotation of each symbol that is based on one or more configurations used for transmission defined by at least one of subcarrier position, modulation scheme, cyclic prefix length, number of subcarriers in transmission and impairments in the transmitter chain. The reduction and/or minimization of signal amplitude variations caused by the compensation rotation allows for inexpensive, high-efficiency power amplifiers to be used in transmitters where a power amplifier can have a smaller or non-existent linear region when compared to more costly power amplifiers. Further, the disclosure advantageously allows for less expensive power amplifiers with smaller or non-existent linear regions to be used in SC-FDMA system like LTE or NB-IoT, in part, due to the reduced in amplitude variations between transitions of symbols. In other words, in one or more embodiments, the amount of rotation, e.g., compensation rotation, that will reduce and/or minimize the amplitude variations between transitions between the symbols is determined and applied at a wireless device.

Before describing in detail exemplary embodiments that are in accordance with the disclosure, it is noted that the embodiments reside primarily in combinations of apparatus/node/user equipment components and processing steps related to rotation of symbols for transmission by a user equipment. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 6:
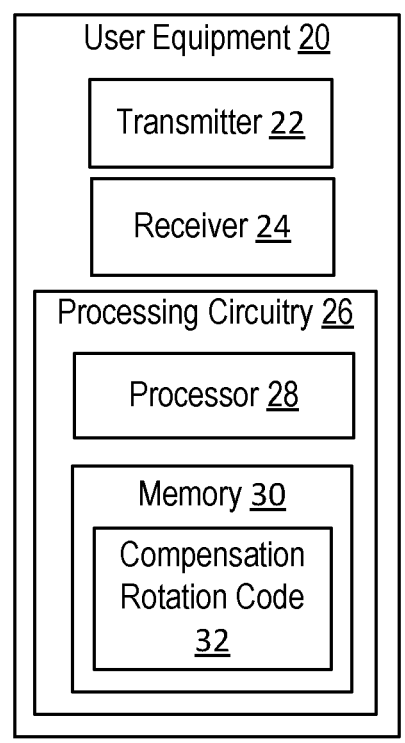
FIG. 6 is a block diagram of an exemplary user equipment for rotating symbols for transmission in accordance with the principles of the disclosure.

Referring now to drawing figures in which like reference designators refer to like elements there is shown in FIG. 6 is a block diagram of an exemplary user equipment (UE) for rotating symbols for transmission in accordance with the principles of the disclosure and designated generally as "20." UE 20 may be a radio communication device, sensor device, target device, device-to-device wireless device, machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art. In some embodiments, UE 20 is configured to rotate the symbols. As such, in some embodiments as discussed below, UE 20 is part of a larger system in which UE 20 is the system element responsible for symbol rotation.

UE 20 includes transmitter 22 for transmission of communication signals and/or data such as the transmission of rotated symbols and/or modulation constellation rotation as described below. In one or more embodiments, transmitter 22 includes transmitter circuitry for transmission of communication signals and/or data such as the transmission of rotated symbols and/or modulation constellation rotation as described below. In one or more embodiments, transmitter 22 includes a transmitter chain configured to transmit the plurality of symbols in which the transmitter chain introduces unwanted amplitude distortion(s) and/or phase distortion(s) that can be predetermined. UE 20 may include receiver 24 for reception of communication signals and/or data. In one or more embodiments, receiver 24 includes receiver circuitry for reception of communication signals and/or data.

In one or more embodiments, transmitter 22 generates OFDM symbols of 128 samples length, before concatenating them with a cyclic prefix of nine samples (ten samples for every seventh symbol). These samples are then filtered with a transmit filter, and transmitted at a sample rate of 1.92 MHz. When concatenating the OFDM symbols, the windowing and overlap method known in the art is used to further smoothen the transmissions between the constellation points. A two sample overlap is used when concatenating the OFDM symbols. The window is a quarter-wave-sine window and has coefficients [½, sqrt(3)/2, 1, 1, . . . , 1, sqrt(3)/2, ½].

For example, in one embodiment the filter coefficients used for the transmit filter are illustrated in Table 1 below.

TABLE 1

Filter coefficients for the transmit filter
Transmit filter coefficients

| 1 | 2 | 3 | 4 | 5 | 6 |
|---|---|---|---|---|---|
| −0.03175 | −0.04683 | −0.03876 | 0.0373 | 0.224437 | 0.550831 |
| 7 | 8 | 9 | 10 | 11 | 12 |
| 1.012177 | 1.5617 | 2.114008 | 2.564381 | 2.817824 | 2.817824 |
| 13 | 14 | 15 | 16 | 17 | 18 |
| 2.564381 | 2.114008 | 1.5617 | 1.012177 | 0.550831 | 0.224437 |
| 19 | 20 | 21 | 22 | | |
| 0.0373 | −0.03876 | −0.04683 | −0.03175 | | |

In one or more embodiments, transmitter 22 and receiver 24 form or are part of one or more communication interfaces that provide communication to node, other UE 20 and/or other entities.

Figure 7:
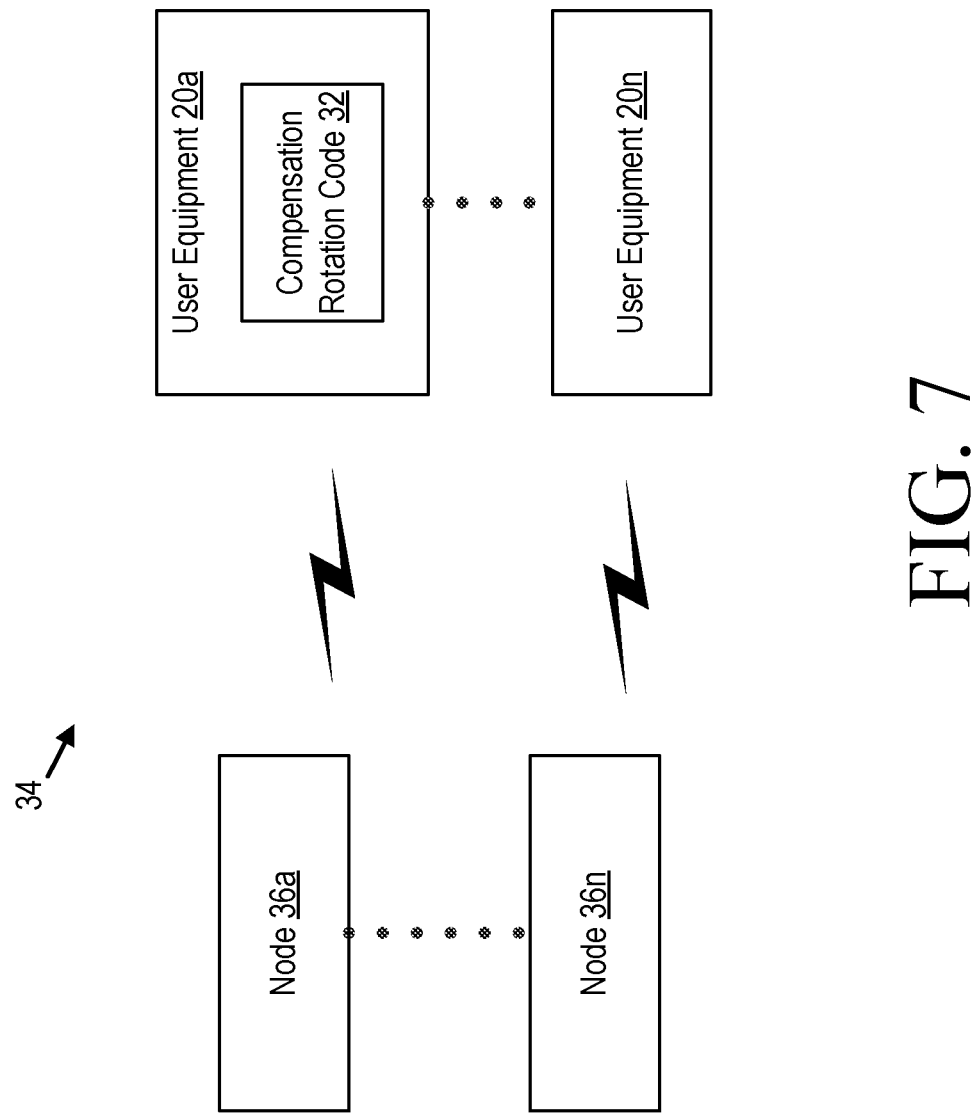
FIG. 7 is a block diagram of an exemplary system for rotating symbols for transmission in accordance with the principles of the disclosure.
Figure 8:
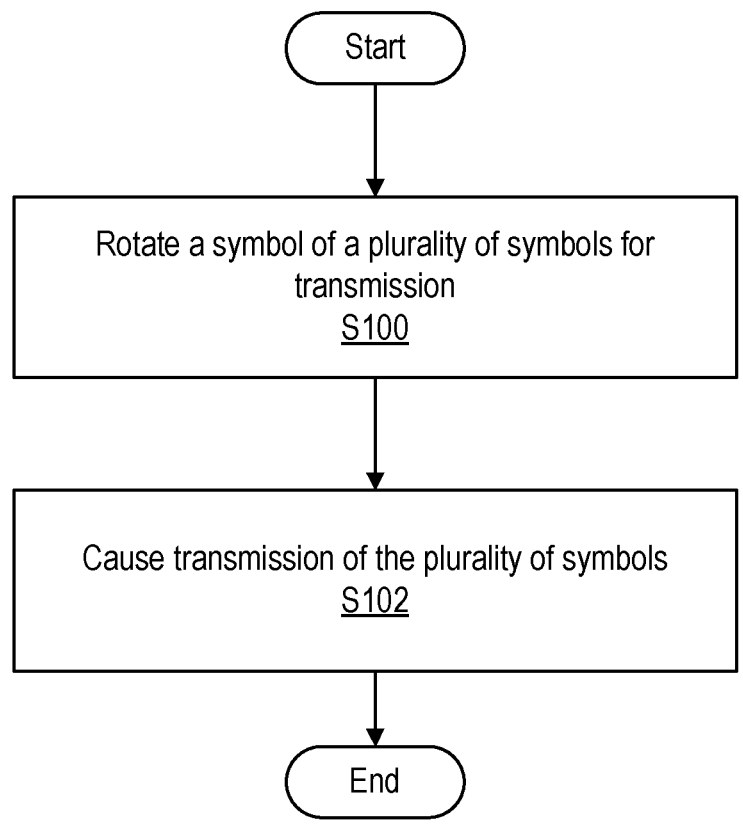
FIG. 8 is a flow diagram of an exemplary rotation process for rotating symbols for transmission in accordance with the principles of the disclosure.

UE 20 includes processing circuitry 26 containing instructions which, when executed configure processing circuitry 26 to perform UE 20 functions such as one or more functions described herein and with respect to FIGS. 7 and 8. In one or more embodiments, processing circuitry 26 includes memory 30 that is configured to store code such as compensation rotation code 32. For example, compensation rotation code 32 includes instructions which, when executed by processor 28, causes processor 28 to perform the rotation process, e.g., compensation rotation, discussed in detail with respect to FIGS. 8-12.

In addition to processor and memory, processing circuitry 26 may comprise integrated circuitry for processing and/or control, e.g., one or more processors and/or processor cores and/or FPGAs (Field Programmable Gate Array) and/or ASICs (Application Specific Integrated Circuitry). Processing circuitry 26 may comprise and/or be connected to and/or be adapted for accessing (e.g., writing to and/or reading from) memory 30, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 30 may be adapted to store code executable by control circuitry and/or other data, e.g., data pertaining to communication, e.g., configuration and/or address data of nodes, modulation and coding schemes such as BPSK and QPSK, etc. Processing circuitry 26 may be adapted to control any of the methods described herein and/or to cause such methods to be performed, e.g., by UE 20. Corresponding instructions may be stored in the memory 30, which may be readable and/or readably connected to the processing circuitry 26. In other words, processing circuitry 26 may include a controller, which may comprise a microprocessor and/or microcontroller and/or FPGA (Field-Programmable Gate Array) device and/or ASIC (Application Specific Integrated Circuit) device. It may be considered that processing circuitry 26 includes or may be connected or connectable to memory, which may be adapted to be accessible for reading and/or writing by the controller and/or processing circuitry 26.

FIG. 7 illustrates an exemplary system for rotation of the symbols by UE 20 for transmission in accordance with the principles of the disclosure and designated generally as "34." System 34 may include one or more nodes 36a-36n and UEs 20a-20n in communication with one or more network nodes, discussed below, via one or more networks (not shown) using one or more communication protocols such as Long-Term Evolution (LTE), LTE advanced or NarrowB and Internet of Things (NB-IoT) based communication protocols, among others known in the art. As used herein, node 36 may be any one of nodes 36a-36n, and UE 20 may be any one of UEs 20a-20n.

FIG. 8 is a flow diagram of an exemplary rotation process for rotating symbols or constellation points for transmission by UE 20. In one or more embodiments, the symbols and/or constellation points are phase rotated to reduce and/or minimize amplitude variation between transitions of the symbols, thereby allowing for smoother transitions between constellation points. This phase rotation may be referred to as compensate rotation as it compensates or counteracts induced rotation discussed below. Processing circuitry 26 rotates a symbol of a plurality of symbols for transmission (Block S100) wherein the transmission may be in the uplink. In one or more embodiments, processing circuitry 26 is configured to rotate the symbol of the plurality of symbols by being configured to apply a phase rotation to the symbol of the plurality of symbols. In one or more embodiments, rotating the symbol of the plurality of symbols includes applying a phase rotation to the symbol of the plurality of symbols.

Uplink as used herein refers to transmission from UE 20 to a base station, node 36 and/or another UE 20 (e.g., device-to-device (D2D) communication). The rotation, e.g., compensation rotation, of one or more symbols for transmission in Block S100 is configured to compensate or counteract an induced rotation caused by at least one attribute or configuration used for transmission, and is different from the predefined modulation rotation dictated by pi/2 BPSK and pi/4 QPSK. For example, in one or more embodiments, the at least one configuration used for transmission includes at least one of cyclic prefix length of the symbol of the plurality of symbols, position of a subcarrier on which the symbol of the plurality of symbols is to be transmitted, amplitude distortion of transmitter 22 and phase distortion of transmitter 22, such that the induced rotation may cause rotation of the symbols in additional to a predefined modulation rotation, as discussed below with respect to FIGS. 9-11.

In other words, a symbol that is rotated by pi/2 according to pi/2 BPSK may suffer from induced rotation during transmission such that the one or more symbols does not adhere to pi/2 BPSK defined rotations and the transitions between the one or more symbols is greater than pi/2, thereby disadvantageously causing amplitude variations. The amount of rotation applied in Block S100 to one or more symbols is configured to counteract or compensate for this induced rotation. In one or more embodiments, the amount of rotation applied to one or more symbols is equal or substantially equal to the induced rotation. In one or more embodiments, the position of the subcarrier on which the one or more symbols is to be transmitted is not centered at a direct current (DC) frequency or zero frequency. This means that in baseband, the signal rotates in the complex plane, and the speed and direction of the rotation is determined by the subcarrier offset. Each OFDM symbol is further extended by the cyclic prefix, so the final symbol is somewhat longer than an integer number of rotations. Because of this, the transitions between pi/2 BPSK symbols is not pi/2 radians or 90 degrees, but depends on the subcarrier position and the cyclic prefix length, i.e., induced rotation magnitude will dependent on one or more factors such as subcarrier position and cyclic prefix length.

In one or more embodiments, an amount of rotation of each of the plurality of symbols is based on at least one of a cyclic prefix length and position of a subcarrier. In one or more embodiments, the rotation of symbols is dependent on subcarrier position or tone index. For example, for SC-FDMA baseband signal generation:

For a single carrier transmission, a time-continuous signal $s_{k,l}(t)$ for sub-carrier index k in SC-FDMA symbol l in an uplink slot may be defined on the form $$s_{k,l}(t) = a_l e^{j\phi_{k,l}} e^{j\alpha}$$

where, $a_l$ is the modulation value of symbol l, $\alpha$ is a nominal phase rotation term of the sinusoidal signal according to the subcarrier position or tone index, and the phase rotation $\phi_{k,l}$ is defined by equation 1. The rotation term that will not contribute to inducing a wanted rotation at the OFDM symbol boundary is absorbed by $\alpha$.

$$\phi_{k,l}(l) = \rho(l \bmod 2) + \hat{\phi}_k(l) \qquad \text{Equation 1}$$

Where $$\rho = \begin{cases} \dfrac{\pi}{2} & \text{for } BPSK \\ \dfrac{\pi}{4} & \text{for } QPSK \end{cases},$$

and $$\hat{\phi}_k(l) = \begin{cases} 0 & l = 0 \\ f(l, k, N_{CP,\ldots}) & l > 0 \end{cases}$$

where l is a symbol counter that is reset at the start of a transmission and incremented for each symbol during the transmission. In other words, the phase rotation $\hat{\phi}_k(l)$ represents the rotation of symbol l due to the predefined modulation rotation of p and the phase rotation of $\hat{\phi}_k(l)$. In particular, the phase rotation term $\hat{\phi}_k(l)$ is dependent on the subcarrier index k, e.g., is based on the subcarrier position.

For example, if pi/2 BPSK is implemented using equation 1, the rotation of each symbol or constellation point may no longer adhere to the predefined pi/2 BPSK rotations of pi/2 (90) degrees, but varies based at least in part on the subcarrier position due to induced rotation caused by the transmission scheme, i.e., a phase rotation term of $\hat{\phi}_k(l)$ is added to the predefined rotations of pi/2 BPSK modulation. However, by compensating for the induced rotation, which induced may correspond to $\hat{\phi}_k(l)$, a plurality of symbols for uplink transmission as described in Block S100, the one or more rotated symbols are rotated in a manner such that the predefined pi/2 BPSK modulation is again maintained. In one or more embodiments, the one or more symbols are rotated using a negative phase rotation $(-\hat{\phi}_k(l))$ that equals or substantially equals the induced rotation for the respective symbol such as to cancel or substantially cancel out the effect of the induced rotation, thereby reducing amplitude variations between symbol transitions, thereby adjusting the rotation of one or more symbols to adhere to the predefined modulation rotation of pi/2 BPSK in light of the induced rotation which may correspond to $\hat{\phi}_k(l)$.

In one or more embodiments, the amount of each rotation of Block S100 is determined by UE 20. Alternatively, in one or more embodiments, the amount of each rotation of Block S100 is determined by node 36 in which node 36 may forward or transmit the one or more compensation rotation amounts to UE 20 for implementation. For example, in one or more embodiments, node 36 transmits symbol rotation data indicating one or more amounts of rotation, i.e., compensation rotation, for each subcarrier such as in the form of Table 2 described below. In one or more embodiments, the one or more amounts of rotation of Block S100 is determined by one of: minimizing the peak-to-average power of the signal, minimizing the cubic metric of the signal, minimizing the back-off that is required to fulfill a spectral emission mask, maximizing the margin to a spectral emission mask and minimizing the interference outside the signal's bandwidth.

In one or more embodiments, in a SC-FDMA transmission, different subcarrier positions are configured, by processing circuitry 26, to use different compensation rotations between BPSK or QPSK symbols as the induced rotation for the different subcarrier positions may vary as described above. Hence, the compensation rotations of symbols on one subcarrier may be different from symbols on another subcarrier have a different subcarrier position. Also, in one or more embodiments, the compensation rotation can also be different for different symbols, since in, e.g., LTE and NB-IoT, every seventh symbol has a longer cyclic prefix, and hence, another or different rotation between symbols is applied, by processing circuitry 26, for one or more symbols to compensate for induced rotation and minimize amplitude variations. For a transmission consisting of multiple subcarriers in SC-FDMA, the compensation rotations are different than for a single-subcarrier transmission. For example, in one or more embodiments, the compensation rotations applied to each subcarrier are different as illustrated in Table 2, below.

In one or more embodiments, the amount of rotation determined in Block S100 is also determined based on induced rotation caused by impairments that are expected in the transmitter chain, such as based on amplitude or phase distortions in the power amplifier. For example, in one or more embodiments, a transmitter chain is part of transmitter 22 and is configured to transmit the plurality of symbols in which the amount of rotation, i.e., compensation rotation, of the plurality of symbols needed to compensate for the induced rotation is further based on one of a predetermined amplitude distortion and a predetermined phase distortion introduced by the transmitter chain.

In one example using Table 2 (below), single-tone pi/2 BPSK transmission without back-off is implemented at UE 20 where the compensation rotation of Block S100 compensates for the induced rotation caused by one or more configurations used for transmission.

TABLE 2

Compensation rotation for a non-ideal (realistic) PA model to fulfill 23 dBm GSM spectrum mask with single-tone pi/2 BPSK Modulation constellation rotation for each subcarrier (SC) offset (degrees (Deg))

| SC | 1 | 2 | 3 | 4 | 5 | 6 |
|---|---|---|---|---|---|---|
| Deg. | 3.0 | 11.1 | 36.1 | 42.8 | 59.5 | 74.4 |
| SC | 7 | 8 | 9 | 10 | 11 | 12 |
| Deg. | 89.7 | 105.7 | 137.4 | 154.5 | 173.1 | 0.1 |

For example, a compensation rotation setting is used for each subcarrier position such that the induced rotation caused by subcarrier position 1 is compensated by a three (3) degree rotation or offset, i.e., the three degree value is one of the values used to rotate a symbol discussed in Block S100.

In one or more embodiments, Table 2 is derived by UE 20 and/or node 36 by maximizing a signal margin to the GSM spectrum masks 14 and/or 16 requirements. In particular, Table 2 illustrates different amounts of rotation of symbols (in degrees) that are applied by UE 20 for compensating for induced rotation of the transmission scheme that are optimized for a power amplifier (PA) model to fulfill a 23 dBm GSM spectrum mask 16 with single-tone pi/2 BPSK without using back-off, i.e., without reduced the maximum output power level of the PA. For example, the amount of back-off required to fulfill the 23 dBm GSM spectrum mask with a PA model for a single-tone BPSK modulation with different constellations rotations is: over 1.5 dBm for no rotation, 2.3 dBm for 90 degrees of rotation and 0 dBm using the values of Table 2. Therefore, while power back-off can be applied to meet the 23 dBm GSM spectrum mask, doing so disadvantageously reduced the maximum output power of the PA such that being able to meet the 23 dBm GSM spectrum mask without power back-off, as described herein using Table 2, for example, advantageously does not reduce the maximum output power of the PA. In one or more embodiments, the compensation rotation described herein maximizes the margin from the GSM spectrum mask. Other Table 2 values may be derived based on the one or more configuration used for transmission of one or more symbols by UE 20.

Processing circuitry 26 causes transmission of the plurality of symbols (Block S102). For example, as illustrated and discussed below in FIGS. 11A-11D, the one or more symbols that have been rotated by the compensation rotation are transmitted by transmitter 22. Hence, the disclosure advantageously rotates the plurality of symbols to compensate for induced rotation caused by one or more configurations used for transmission of the plurality of symbols to reduce and/or minimize the amplitude variations between transitions of the symbols in which this reduction and/or minimization of signal amplitude variations advantageously allows for inexpensive, high-efficiency power amplifiers to be used in transmitters where a power amplifier can have a smaller or non-existent linear region when compared to more costly power amplifiers, and further advantageously allows for these less expensive power amplifier with smaller or non-existent linear regions to be used in SC-FDMA system like LTE or NB-IoT.

FIGS. 9A-9D are exemplary constellation diagrams of respective symbols according to a predefined modulation rotation of pi/2 BPSK without induced rotation. For example, the first symbol illustrated in FIG. 9A has phases of zero (one bit) and pi (zero bit). The second symbol illustrated in FIG. 9B has phases of pi/2 (one bit) and −pi/2 (zero bit). The third symbol illustrated in FIG. 9C has phases of pi (one bit) and 0 (zero bit), and the fourth symbol illustrated in FIG. 9D has phases of negative pi/2 (one bit) and pi/2 (zero bit). The transition or rotation between symbols is pi/2.

FIGS. 10A-10D are exemplary constellation diagrams of respective symbols according to a predefined modulation rotation of pi/2 BPSK, and according to induced rotation caused by one or more configurations for transmission of the respective symbols. For example, the first symbol illustrated in FIG. 10A has phases of zero (one bit) and pi (zero bit), the same as FIG. 9A, but the second symbol illustrated in FIG. 10B has phases greater different from pi/2 (one bit) and negative pi/2 (zero bit) due to the additional rotation (y) caused by the induced rotation. The degree of the additional rotation varies based on one or more configurations for transmission of the symbol(s). The third symbol has phases different from pi (one bit) and zero (zero bit) that is caused by the induced rotation. In particular, third symbol will have a phase of 2y+pi/2 for the one bit and a phase of 2y+0 for the zero bit as the phase value of 2y includes the induced rotation of y on the second symbol and an induced rotation of y on the third symbol, thereby adding up to 2y. The fourth symbol illustrated in FIG. 10D will have a phase of 3y+negative pi/2 for the one bit and a phase of 3y+pi/2 for the zero bit. In other words, an induced rotation of y is added by and during transmission at the second symbol, third symbol and fourth symbol, thereby leaving the fourth symbol with an induced rotation of 3y. Therefore, the phase of the one bit for the four symbols illustrated in FIGS. 10A-10D is:

$1^{st}$ symbol: 0
$2^{nd}$ symbol: y+pi/2
$3^{rd}$ symbol: 2y+pi/2
$4^{th}$ symbol: 3y+pi/2 where y is the induced rotation caused by one or more configurations for transmission of the symbols during transmission. In other words, an induced rotation of y° is added at each of the second, third and fourth symbol such that the total induced rotation at the third symbol is 2y° and at the fourth symbol is 3y°. The induced rotation between symbols or transition between symbols will therefore be y (in this example) or a multiple of y, which disadvantageously causes signal amplitude variations.

Figures 10A, 10B, 10C, 10D:
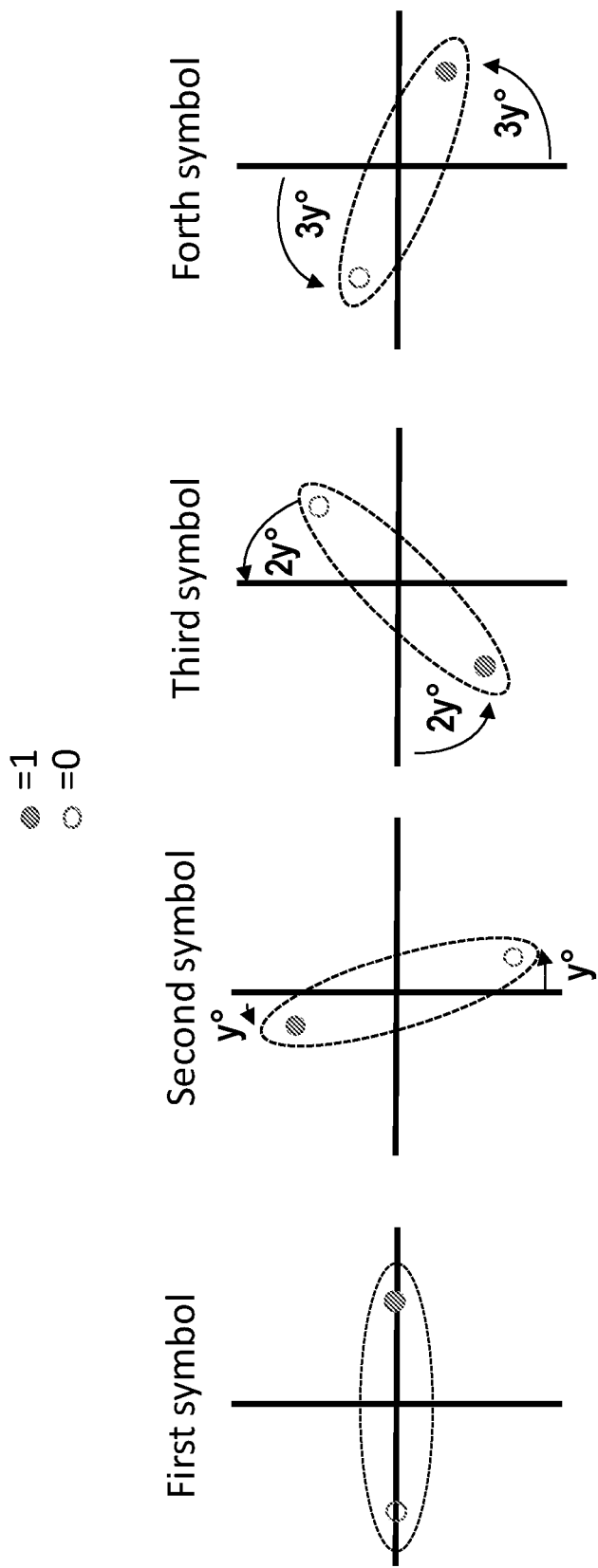
FIGS. 10A-10D are constellation diagrams of respective symbols according to a predefined modulation rotation of pi/2 BPSK, and according to induced rotation caused by one or more configurations for transmission of the respective symbols, in accordance with the principles of the disclosure.

FIGS. 11A-11D are exemplary constellation diagrams of respective symbols according to a predefined modulation rotation of pi/2 BPSK where the induced rotation caused by one or more configurations for transmission has been compensated for or counteracted by rotating the symbols as described in Block S100. In particular, while the first symbol illustrated in FIG. 11A was not affected by the induced rotation, and therefore did not require rotation described in Block S100, the remaining three symbols did require rotation in order to compensate for the induced rotation caused by the transmission scheme during transmission, and thereby reduce signal amplitude variations caused by varying transitions between symbols. For example, the second symbol illustrated in FIG. 11B is rotated by x° in accordance with Block S100 such that the phase of second symbol is again pi/2 for the one bit and negative pi/2 for the zero bit after the induced rotation has impacted the second symbol. The third symbol illustrated in FIG. 11C is rotated by 2x° (i.e., including the compensation rotation applied to the second symbol (x°) and the compensation rotation applied to the third symbol (x°), thereby equaling 2x°) in accordance with Block S100, thereby leaving the third symbol with a phase of pi for the one bit and zero for the zero bit. Also, the fourth symbol illustrated in FIG. 11D is rotated by 3x° (including the compensation rotation applied to the second symbol (x°), third symbol (x°) and fourth symbol (x°), thereby equaling 3x°) in accordance with Block S100 such that a phase of: −pi/2 is reestablished for the one bit and pi/2 is reestablished for the zero bit. In the examples of FIGS. 11A-11D, x° is equal to y° that is illustrated in FIGS. 10B-10D such that the symbols once again follow the predefined modulation rotation of FIG. 9B-9D after the impact of the induced rotation. In other words, one or more symbols are rotated in accordance with Block S100 to reestablish their respective predefined modulation rotation during transmission by compensating for induced rotation caused by the transmission scheme. In one or more other embodiments, x° is not equal to y° but still allows for the reduction in signal amplitude variations caused by varying transitions between symbols. In one or more other embodiments, x° corresponds to $\hat{\phi}_k(l)$ described above.

Figure 12:
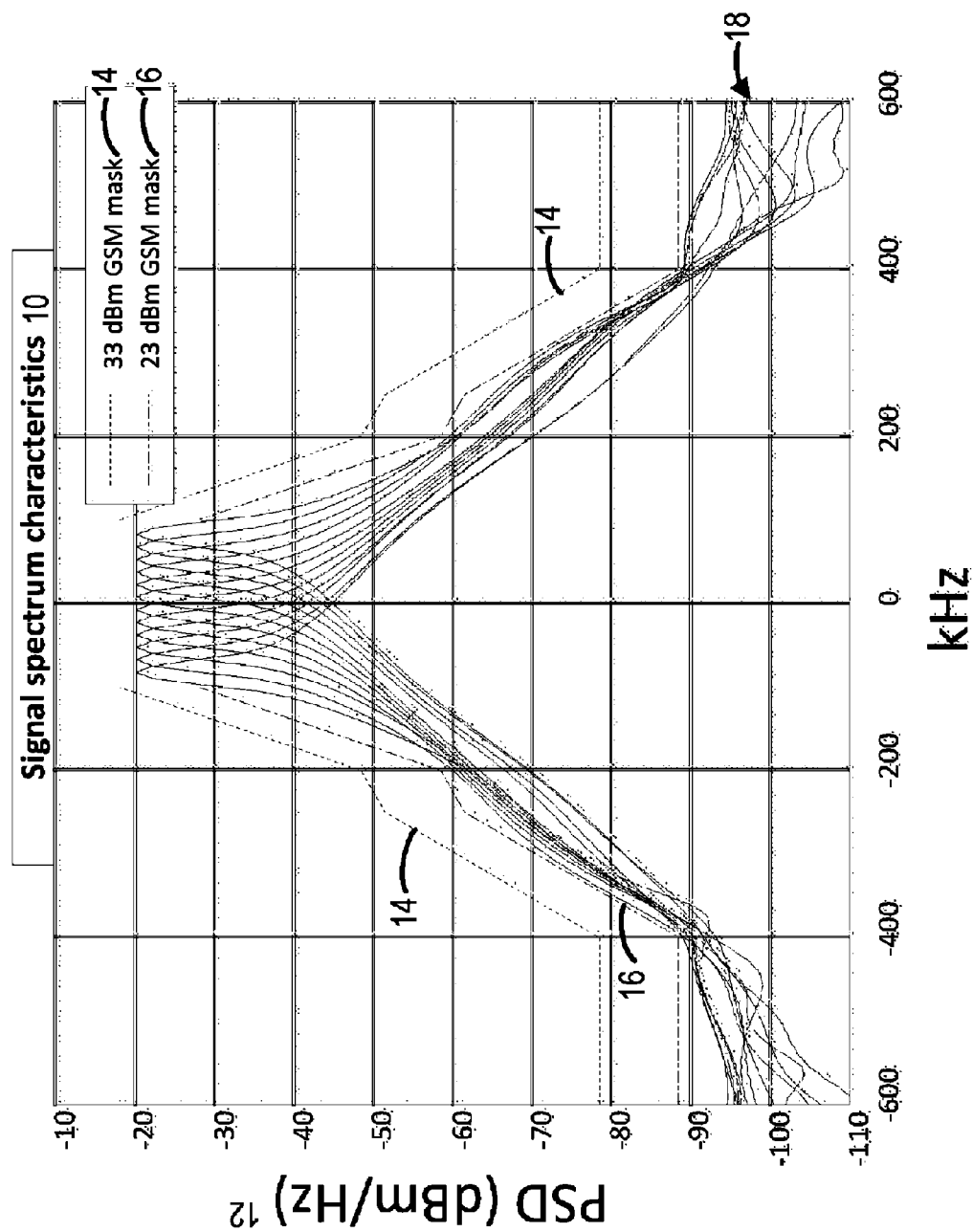
FIG. 12 is a diagram of the power spectral density of single-subcarrier pi/2 BPSK transmission at different subcarrier positions, with rotated symbols and without back-off, in accordance with the principles of the disclosure.

FIG. 12 is a diagram of the power spectral density of single-subcarrier pi/2 BPSK transmission at different subcarrier positions, and symbol rotation according to Block S100 with rotation values illustrated in Table 2, where no back-off is implemented. Separate and distinct compensation rotation is applied to each subcarrier position where the particular rotation values are determined such as to maximize the margin between the respective subcarrier and GSM spectrum mask. In particular, FIG. 12 implements a PA model with impairments that mimic a realistic PA model as an ideal (unrealistic) PA model would likely not have issues with meeting a GSM spectral emission mask (GSM mask) requirements, discussed below, but would likely fail in the field or real life. The PA model includes significant distortion, and at symbol transition, this distortion changes since the amplitude of the input signal changes. Because of this, the compensation rotation is optimized for, and at least partially compensates for, the particular phase distortion used in the PA model such that another PA model with different distortion would likely benefit from a different set of rotations than the rotations illustrated in Table 2.

For example, in one or more embodiments, processing circuitry 26 is further configured to cause transmission of the rotated plurality of symbols, i.e., rotated according to Block S100, on at least one other subcarrier, and the power spectral density of each subcarrier meeting requirements of a 23 dBm mask 16 without power back-off. In particular, as illustrated in FIG. 12, the power spectral density of single-subcarrier pi/2 BPSK meets the requirements of both the 33 dBm GSM mask 14 requirements and 23 dBm GSM mask 16 requirements, and does so without requiring the implementation of back-off. In other words, implementing the rotation of one or more symbols according to Block S100 using values illustrated in Table 2 allows for a power amplifier to be used for transmission that does not require back-off to compensate induced rotation that cause more abrupt than expected transitions between symbols, which result in greater amplitude variations. Hence, by implementing symbol rotations as discussed herein, signal amplitude variations are reduced and/or minimized, thereby allowing for inexpensive, high-efficiency power amplifiers to be used in transmitters where a power amplifier can have a smaller or non-existent linear region when compared to more costly power amplifiers.

In another example, an amount of PA back-off that is required to meet a 33 dBm mask for a realistic PA model for single and multi-tone QPSK, and single BPSK is shown in Table 3.

TABLE 3

Amount of back-off required to fulfil the 33 dBm GSM mask

| | PA back-off Number of subcarriers | | | | | | |
|---|---|---|---|---|---|---|---|
| | 1 | 2 | 3 | 4 | 6 | 8 | 12 |
| pi/2 BPSK | 0 | | | | | | |
| BPSK with compensation rotation | 0 | | | | | | |
| QPSK | 0 | 0.1 | 0.4 | 1.0 | 2.1 | 3.2 | 4.3 |

As illustrated in Table 3, NB-IoT uplink satisfies the 33 dBm GSM spectrum mask without back-off for single tone transmissions, and with limited back off for multi-tone transmissions.

In yet another example, an amount of PA back-off that is required to meet a 23 dBm mask for a realistic PA model for single and multi-tone QPSK, and single BPSK is shown in Table 4.

TABLE 4

Amount of back-off required to fulfil the 23 dBm GSM mask

| | PA back-off Number of subcarriers | | | | | | |
|---|---|---|---|---|---|---|---|
| | 1 | 2 | 3 | 4 | 6 | 8 | 12 |
| pi/2 BPSK | 2.3 | | | | | | |
| BPSK with compensation rotation | 0 | | | | | | |
| QPSK | 2.2 | 2.5 | 2.9 | 3.5 | 4.5 | 5.5 | 5.8 |

As illustrated in Table 4, NB-IoT uplink satisfies the 23 dBm GSM spectrum mask with 15 kHz single-tone without back off with compensation rotation described herein. Without such compensation rotation, a back of around 2 dB is required for single-tone transmission to satisfy the 23 dBm GSM spectrum mask, at least for edge subcarriers, and an additional 0.3-3.6 dB back off is required for multi-tone transmission to satisfy the 23 dBm GSM spectrum mask.

Therefore, NB-IoT with 15 kHz subcarrier spacing easily fulfills the GSM spectral emission mask requirements with an ideal (unrealistic) PA. With impairments in the PA model (realistic PA), NB-IoT uplink fulfills the 33 dBm GSM spectrum mask without back-off for single-tone transmissions, and with limited back-off for multi-tone transmissions. With impairments in the PA model (realistic PA), NB-IoT fulfills the 23 dBm GSM spectrum mask with 15 kHz single-tone transmission without back-off with compensation rotation described herein. Without compensation rotation, a back-off of around 2 dB is required for single-tone transmission, at least for edge subcarriers, and an additional 0.3-3.6 dB back-off for multi-tone transmission.

Figure 13:
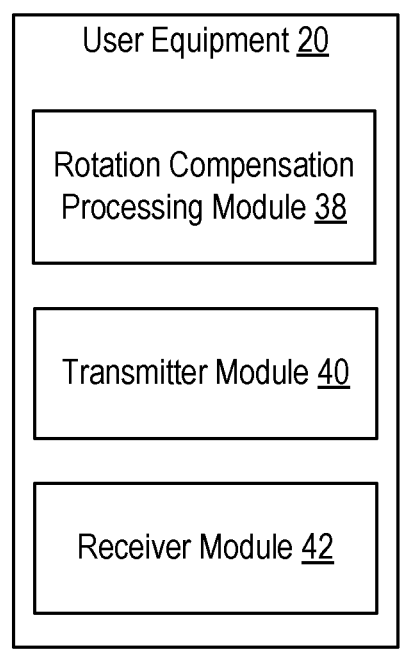
FIG. 13 is a block diagram of another embodiment of exemplary UE in accordance with the principles of the disclosure.

FIG. 13 is a block diagram of another embodiment of exemplary UE 20. UE 20 includes rotation compensation processing module 38 that is configured to rotate symbols for uplink transmission as discussed above with respect to FIGS. 11A-11D. In one or more embodiments, the symbols and/or constellation points are phase rotated to compensate and/or counteract for induced rotation, thereby reducing and/or minimizing amplitude variation between transitions of the symbols, which allows for smoother transitions between constellation points. The reduction and/or minimization of signal amplitude variations allows for inexpensive, high-efficiency power amplifiers to be used in transmitters where a power amplifier can have a smaller or non-existent linear region when compared to more costly power amplifiers. Further, the process of rotating symbols for uplink transmission advantageously allows for less expensive power amplifiers with smaller or non-existent linear regions to be used in SC-FDMA system like LTE or NB-IoT, in part, due to the reduced in amplitude variations between transitions of symbols. In one or more embodiments, UE 20 further includes a transmitter module 40 and receiver module 42 for transmitting and receiving signals as described above with respect transmitter 22 and receiver 24.

The present disclosure provides numerous advantages for general transmission and especially when implemented in NB-IoT uplink transmission, e.g., uplink transmission, where no subcarrier is centered at the DC frequency. As the inventors have discovered, transmission without a subcarrier center at the DC frequency means that in baseband, the signal rotates in the complex plane, and the speed and direction of the rotation, i.e., induced rotation, is determined by the subcarrier offset. Each OFDM symbol in the signal is further extended by the cyclic prefix, so the final symbol is somewhat longer than an integer number of rotations. Because of these one or more configurations for transmission, amplitude transitions between symbols such as pi/2 BPSK symbols is not pi/2 radians or 90 degrees, but will depend on the subcarrier position and the cyclic prefix length, and the amplitude transition between symbols can be more abrupt than expected resulting in bigger amplitude variations, which is accounted for in the present disclosure's teaching of symbol rotations according to Block S100, i.e., the present disclosure accounts for induced rotation during transmission.

Figure 1:
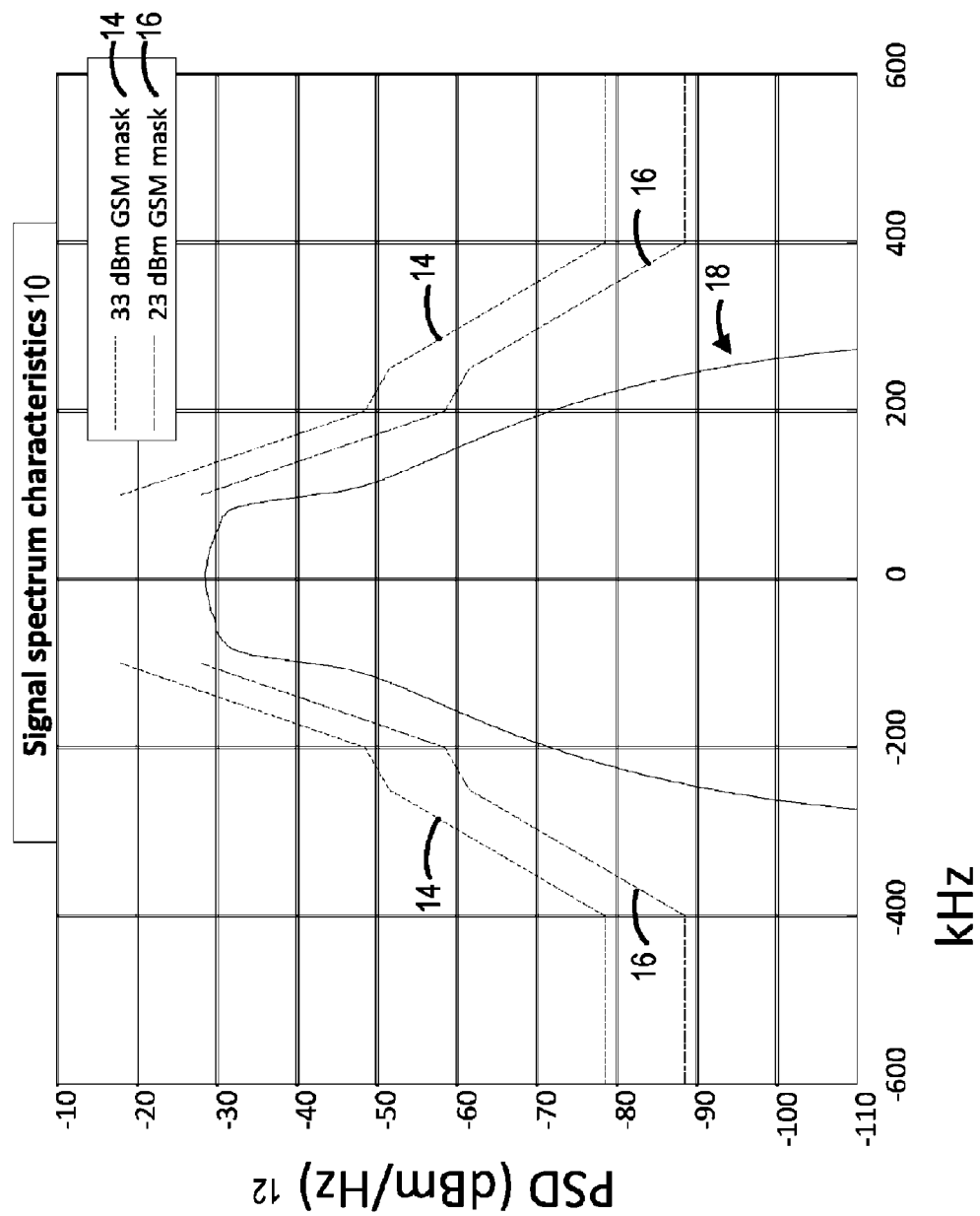
FIG. 1 is a diagram of signal spectrum characteristics of a twelve subcarrier or twelve tone transmission.
Figure 2:
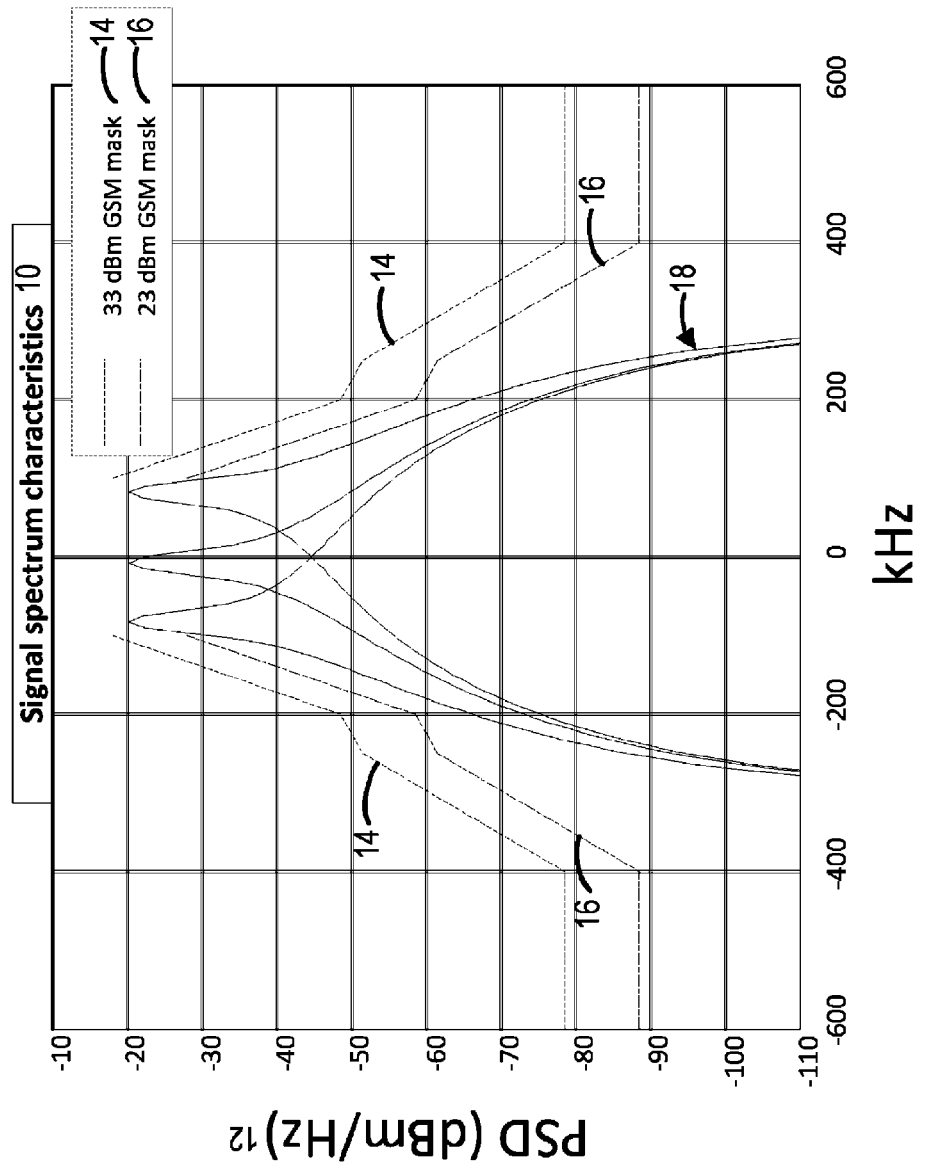
FIG. 2 is a diagram of signal spectrum characteristics of a single-subcarrier transmission of NB-lot with 15 kHz subcarrier spacing.
Figure 3:
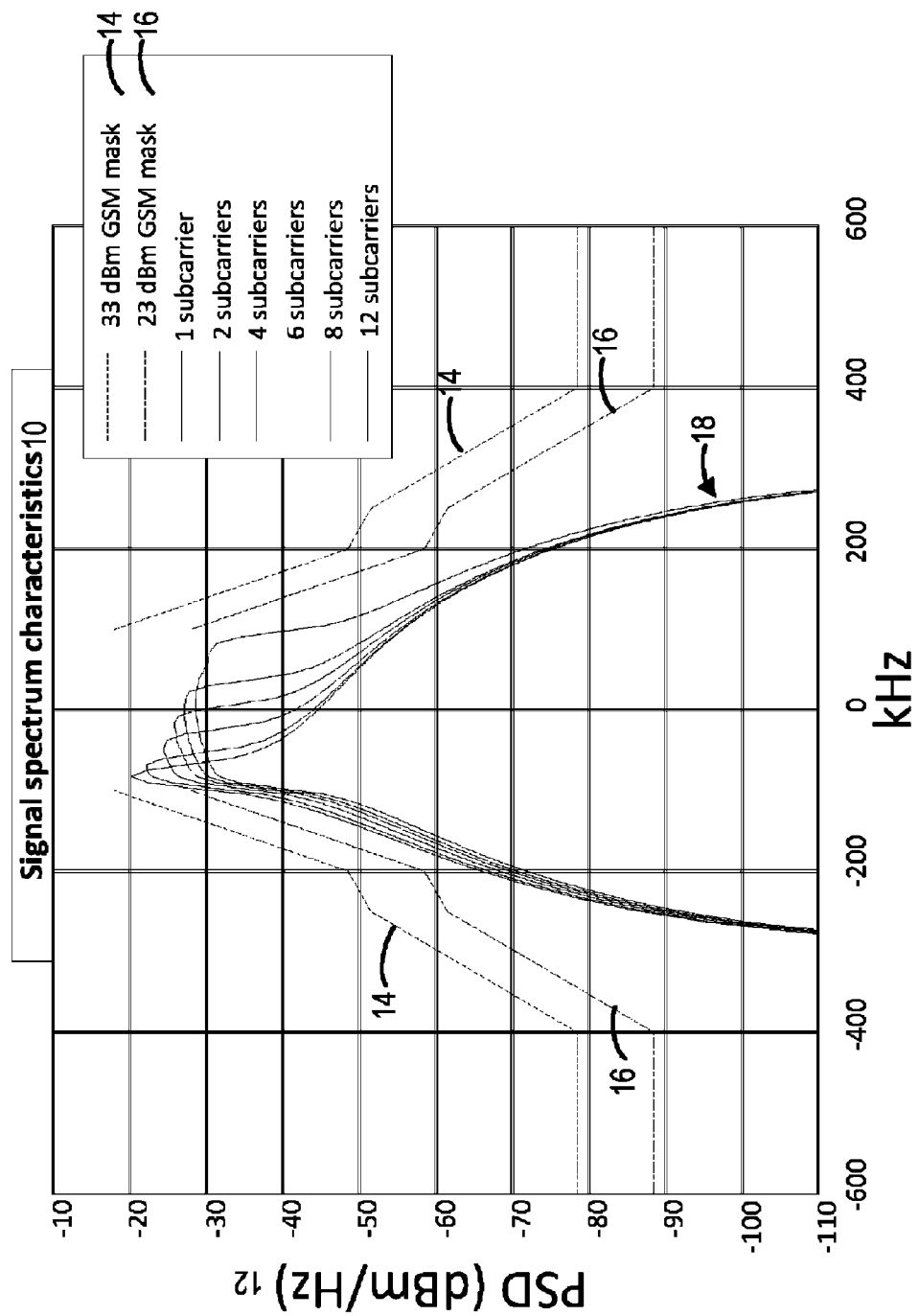
FIG. 3 is a diagram of signal spectrum characteristics of multi-tone NB-IoT with 15 kHz spacing.

The power amplifier model/characteristics used to generate FIGS. 1, 2 and 12 include a significant phase distortion, and at symbol transitions this distortion changes since the amplitude of the input signal changes. Because of this, the rotations presented in Table 2 that are applied at Block S100 are optimized for, and at least partially compensate, the particular phase distortion model/characteristics, and it is therefore noted that another PA model or actual PA may benefit from a set of symbol rotations other than those illustrated in Table 2. In other words, in one or more embodiments, a set of symbol rotations other than those in Table 2 can be determined to at least partially compensate for the particular phase distortion model/characteristics of another PA such as to compensate for the induced rotations of a different scheme or configuration(s) for transmission. Therefore, the instant disclosure describes a UE that rotates symbols and/or modulation constellations points in which the amounts/degrees of rotation for the symbols depends on or is based on one or more configurations for transmission such as at least one of subcarrier position, cyclic prefix length, number of subcarriers in transmission, impairments in the transmitter chain and other factors/characteristics described herein, thereby allowing the instant disclosure to compensate for induced rotation during transmission.

Other example embodiments include:

Embodiment 1

A wireless device, comprising:
processing circuitry, the processing circuitry including a processing and a memory, the memory containing instructions that, when executed by the processor, configure the processor to rotate a plurality of symbols for uplink transmission to reduce amplitude variations between at least one transition of the plurality of symbols; and a transmitter, the transmitter configured to cause transmission of the rotated plurality of symbols.

Embodiment 2

The wireless device of Embodiment 1, wherein an amount of rotation of each of the plurality of symbols is based on at least one of a subcarrier position and cyclic prefix length.

Embodiment 3

The wireless device of Embodiment 2, wherein the plurality of symbols are a plurality of Binary Phase-Shift Key, BPSK, symbols, the amount of rotation between at least two BPSK symbols of the plurality of BPSK symbols being other than 0 and 90 degrees.

Embodiment 4

The wireless device of Embodiment 2, wherein the amount of rotation of the plurality of symbols is further based on one of amplitude distortion and phase distortion.

Embodiment 5

The wireless device of Embodiment 1, wherein the subcarrier position is not centered at a DC frequency.

Embodiment 6

The wireless device of Embodiment 1, wherein an amount of rotation of each of the plurality of symbols is determined to one of: minimize a peak-to-average power of the transmission, minimize a cubic metric of the transmission, minimize a back-off for meeting a predefined spectral emission mask, maximize a margin to the predefined spectral emission mask, and minimize an interference outside the transmission's bandwidth.

Embodiment 7

A method, comprising:
rotating a plurality of symbols for uplink transmission to reduce amplitude variations between at least one transition of the plurality of symbols; and
causing transmission of the rotated plurality of symbols.

Embodiment 8

The method of Embodiment 7, wherein an amount of rotation of each of the plurality of symbols is based on at least one of a subcarrier position and cyclic prefix length.

Embodiment 9

The method of Embodiment 8, wherein the plurality of symbols are a plurality of Binary Phase-Shift Key, BPSK, symbols, the amount of rotation between at least two BPSK symbols of the plurality of BPSK symbols being other than 0 and 90 degrees.

Embodiment 10

The method of Embodiment 8, wherein the amount of rotation of the plurality of symbols is further based on one of amplitude distortion and phase distortion.

Embodiment 11

The method of Embodiment 7, wherein the subcarrier position is not centered at a DC frequency.

Embodiment 12

The method of Embodiment 7, wherein an amount of rotation of each of the plurality of symbols is determined to one of: minimize a peak-to-average power of the transmission, minimize a cubic metric of the transmission, minimize a back-off for meeting a predefined spectral emission mask, maximize a margin to the predefined spectral emission mask, and minimize an interference outside the transmission's bandwidth.

Embodiment 13

A wireless device, comprising:
a processing module, the processing module configured to rotate a plurality of symbols for uplink transmission to reduce amplitude variations between at least one transition of the plurality of symbols; and
a transmitter module, the transmitter module configured to cause transmission of the rotated plurality of symbols.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A user equipment (UE) comprising:
  processing circuitry configured to rotate a symbol of a plurality of symbols for transmission, an amount of rotation of the symbol of the plurality of symbols being based on a cyclic prefix length of the symbol of the plurality of symbols and a position of a subcarrier on which the symbol of the plurality of symbols is to be transmitted; and
  a transmitter configured to cause transmission of the plurality of symbols.

2. The UE of claim 1, wherein the symbol of the plurality of symbols has a predefined modulation rotation in addition to the amount of rotation of the symbol of the plurality of symbols.

3. The UE of claim 2, wherein the predefined modulation rotation is based on one of Binary Phase-Shift Keying (BPSK) modulation and Quadrature Phase Shift Keying (QPSK) modulation.

4. The UE of claim 2, wherein the amount of rotation of the symbol of the plurality of symbols is configured to counteract an induced rotation caused by at least one transmission configuration of the symbol of the plurality of symbols during transmission, the induced rotation being different from the predefined modulation rotation.

5. The UE of claim 4, wherein the at least one configuration for transmission of the symbol of the plurality of symbols includes at least one of the cyclic prefix length of the symbol of the plurality of symbols, the position of the subcarrier on which the symbol of the plurality of symbols is to be transmitted, amplitude distortion of the transmitter and phase distortion of the transmitter.

6. The UE of claim 4, wherein the amount of rotation of the symbol of the plurality of symbols is substantially equal to the induced rotation.

7. The UE of claim 4, wherein the amount of rotation of the symbol of the plurality of symbols is configured to compensate for the induced rotation such that the symbol of the plurality of symbols adheres to the predefined modulation rotation.

8. The UE of claim 4, wherein the processing circuitry is further configured to rotate an additional symbol of the plurality of symbols by the amount of rotation of the symbol of the plurality of symbols, the amount of rotation being configured to counteract the induced rotation such that the additional symbol of the plurality of symbols adheres to the predefined modulation rotation.

9. The UE of claim 2, wherein the predefined modulation rotation is one of 45 and 90 degrees.

10. The UE of claim 9, wherein the amount of rotation of the symbol of the plurality of symbols is with respect to a modulation constellation diagram.

11. The UE of claim 10, wherein the plurality of symbols are transmitted at different instances of time.

12. The UE of any one of claim 1, wherein the position of the subcarrier is not centered at a direct current (DC) frequency.

13. The UE of claim 1, wherein the transmitter is a transmitter chain, the amount of rotation of the symbol of the plurality of symbols being further based on one of a predetermined amplitude distortion and a predetermined phase distortion, introduced by the transmitter chain.

14. The UE of claim 1, wherein the processing circuitry is configured to rotate the symbol of the plurality of symbols by being configured to apply a phase rotation to the symbol of the plurality of symbols.

15. A method, comprising:
  rotating a symbol of a plurality of symbols for transmission, an amount of rotation of the symbol of the plurality of symbols being based on a cyclic prefix length of the symbol of the plurality of symbols and a position of a subcarrier on which the symbol of the plurality of symbols is to be transmitted; and
  causing, by a transmitter, transmission of the plurality of symbols.

16. The method of claim 15, wherein the symbol of the plurality of symbols has a predefined modulation rotation in addition to the amount of rotation of the symbol of the plurality of symbols.

17. The method of claim 16, wherein the predefined modulation rotation is one of Binary Phase-Shift Keying (BPSK) modulation and Quadrature Phase Shift Keying (QPSK) modulation.

18. The method of claim 16, wherein the amount of rotation of the symbol of the plurality of symbols is configured to counteract an induced rotation caused by at least one transmission configuration of the symbol of the plurality of symbols during transmission, the induced rotation being different from the predefined modulation rotation.

19. The method of claim 18, wherein the at least one configuration for transmission of the symbol of the plurality of symbols includes at least one of the cyclic prefix length of the symbol of the plurality of symbols, the position of the subcarrier on which the symbol of the plurality of symbols is to be transmitted, amplitude distortion of the transmitter and phase distortion of the transmitter.

20. The method of claim 18, wherein the amount of rotation of the symbol of the plurality of symbols is substantially equal to the induced rotation.

21. The method of claim 18, wherein the amount of rotation of the symbol of the plurality of symbols is configured to compensate for the induced rotation such that the symbol of the plurality of symbols adheres to the predefined modulation rotation.

22. The method of claim 18, further comprising rotating an additional symbol of the plurality of symbols by the amount of rotation of the symbol of the plurality of symbols, the amount of rotation being configured to counteract the induced rotation such that the additional symbol of the plurality of symbols adheres to the predefined modulation rotation.

23. The method of claim 16, wherein the predefined modulation rotation is one of 45 and 90 degrees.

24. The method of claim 15, wherein the amount of rotation of the symbol of the plurality of symbols is with respect to a modulation constellation diagram.

25. The method of claim 15, wherein the plurality of symbols are transmitted at different instances of time.

26. The method of claim 15, wherein the position of the subcarrier is not centered at a direct current (DC) frequency.

27. The method of claim 15, wherein the plurality of symbols are transmitted by the transmitter which is a transmitter chain, the amount of rotation of the symbol of the plurality of symbols being further based on one of a predetermined amplitude distortion and a predetermined phase distortion, introduced by the transmitter chain.

28. The method of claim 15, wherein rotating the symbol of the plurality of symbols comprises applying a phase rotation to the symbol of the plurality of symbols.

* * * * *

UNITED STATES PATENT AND TRADEMARK OFFICE
CERTIFICATE OF CORRECTION

| | | |
|---|---|---|
| PATENT NO. | : 9,853,846 B2 | Page 1 of 1 |
| APPLICATION NO. | : 15/403753 | |
| DATED | : December 26, 2017 | |
| INVENTOR(S) | : Johansson et al. | |

It is certified that error appears in the above-identified patent and that said Letters Patent is hereby corrected as shown below:

In the Drawings

In Fig. 9D, Sheet 9 of 13, delete "Forth" and insert -- Fourth --, therefor.

In Fig. 10D, Sheet 10 of 13, delete "Forth" and insert -- Fourth --, therefor.

In Fig. 11D, Sheet 11 of 13, delete "Forth" and insert -- Fourth --, therefor.

In the Specification

In Column 5, Line 2, delete "NB-lot" and insert -- NB-IoT --, therefor.

In Column 8, Line 49, delete "Array)" and insert -- Arrays) --, therefor.

In Column 8, Line 50, delete "Circuitry)." and insert -- Circuitries). --, therefor.

In Column 9, Line 17, delete "NarrowB and" and insert -- NarrowBand --, therefor.

In Column 10, Line 50, delete "p" and insert -- ρ --, therefor.

In Column 14, Line 10, delete "FIG. 9B-9D" and insert -- FIGS. 9B-9D --, therefor.

In the Claims

In Column 20, Line 47, in Claim 12, delete "UE of any one of claim" and insert -- UE of claim --, therefor.

Signed and Sealed this
Twenty-sixth Day of June, 2018

Andrei Iancu
*Director of the United States Patent and Trademark Office*